Figure 5:
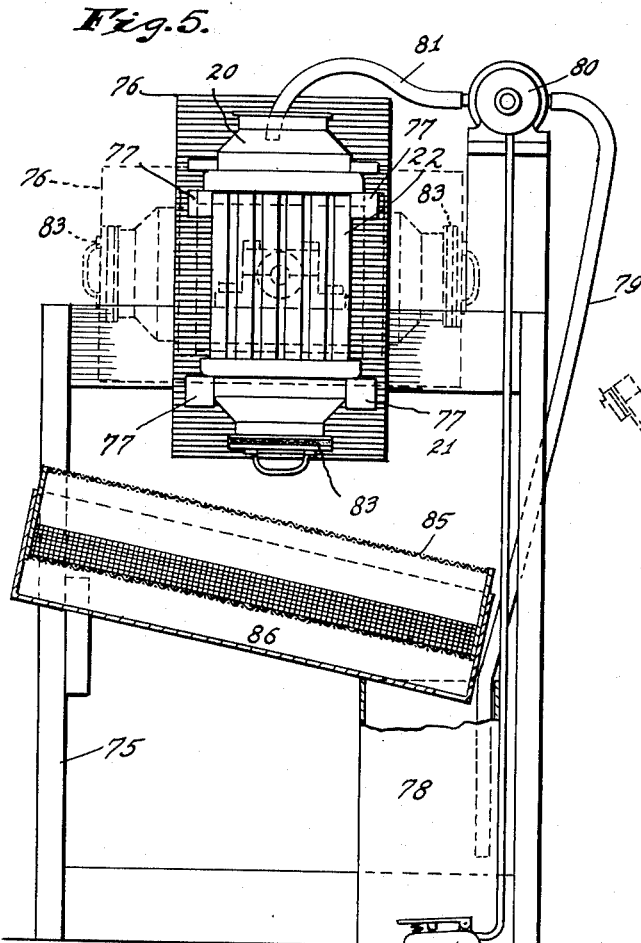

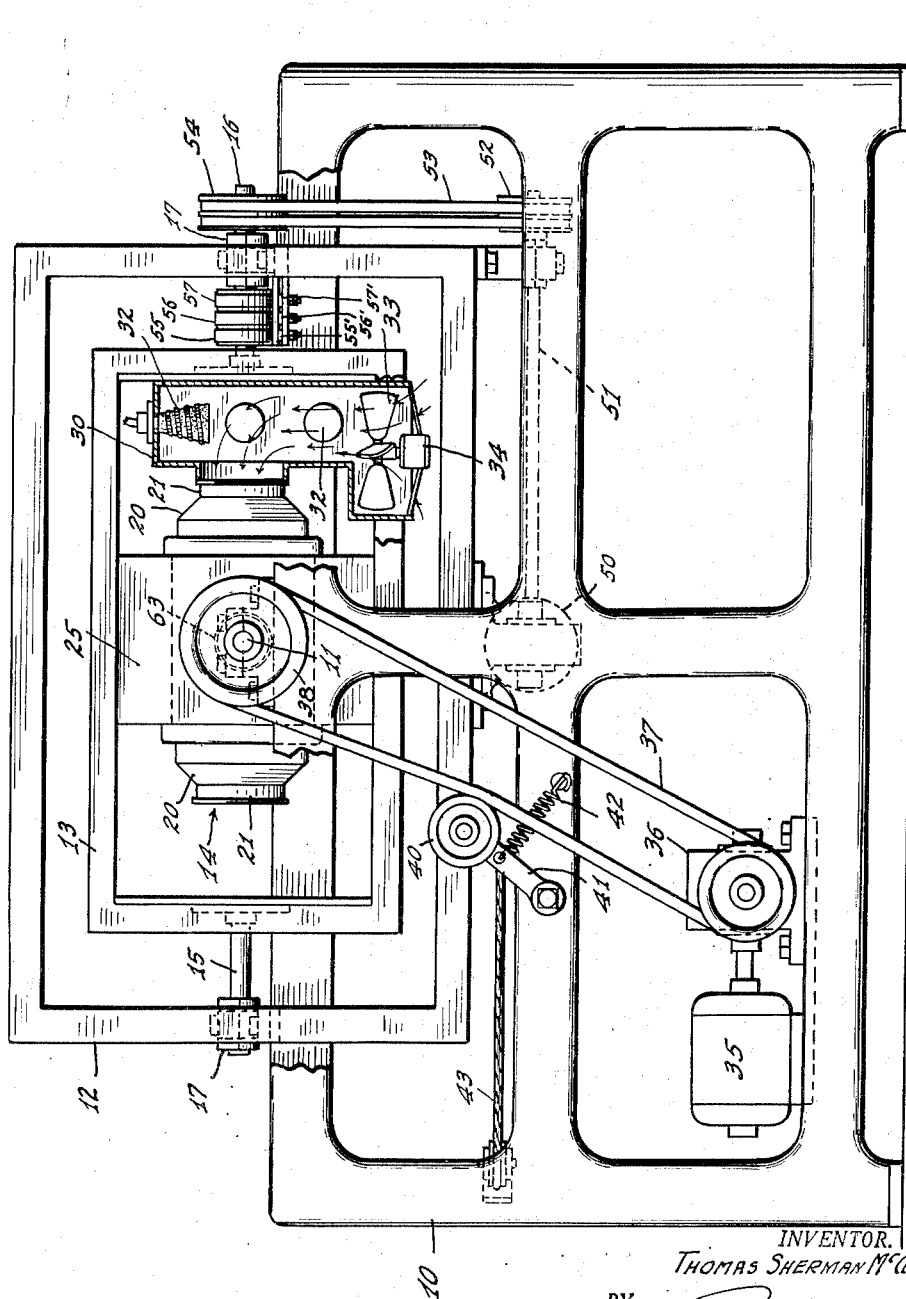

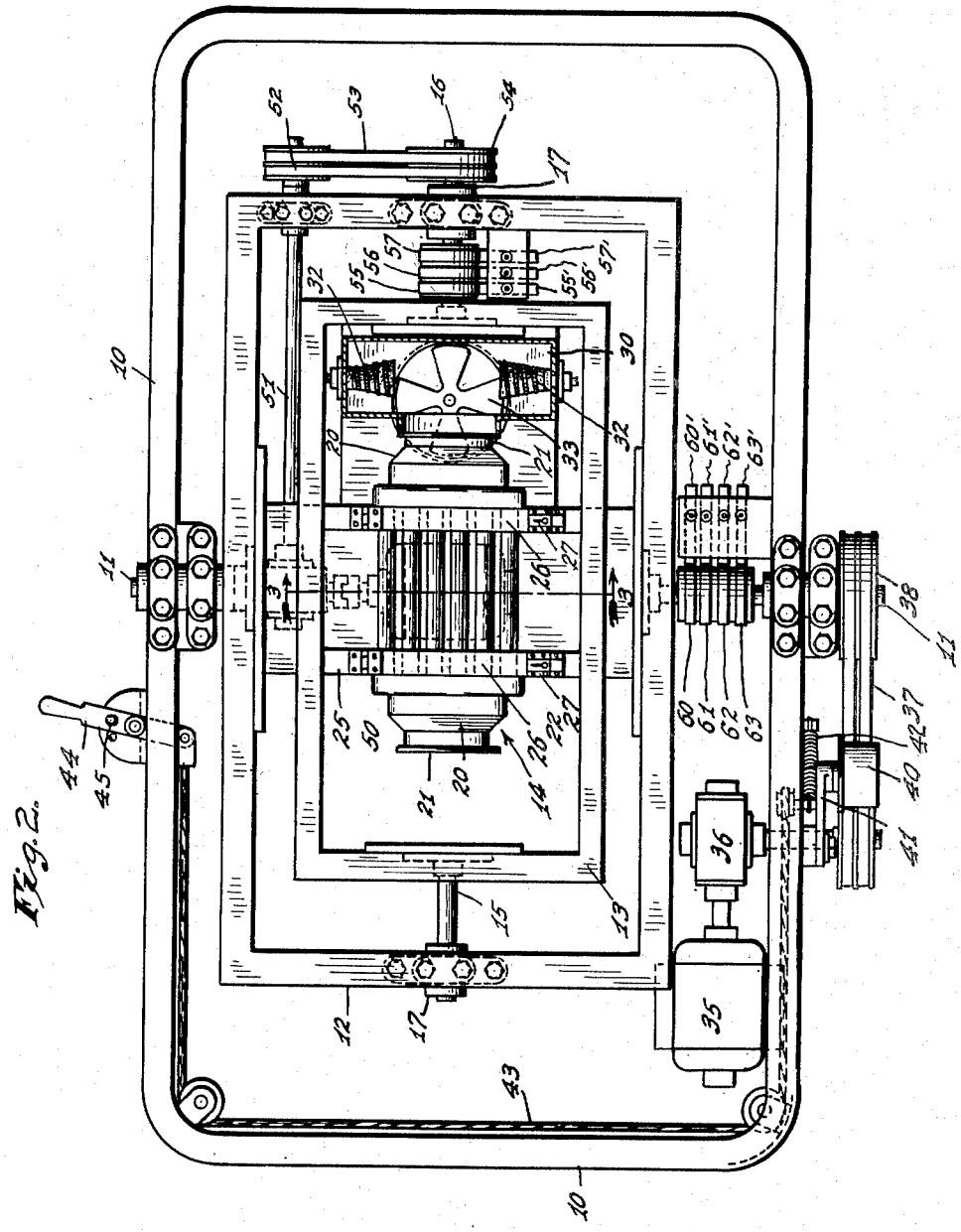

March 23, 1954  T. S. McCLEAN  2,672,843
ROTARY COATING AND DRYING APPARATUS
Filed Aug. 7, 1950  3 Sheets-Sheet 3

INVENTOR.
THOMAS SHERMAN McCLEAN,
BY
ATTORNEYS.

Patented Mar. 23, 1954

2,672,843

UNITED STATES PATENT OFFICE 2,672,843

ROTARY COATING AND DRYING APPARATUS

Thomas Sherman McClean, Indianapolis, Ind.

Application August 7, 1950, Serial No. 178,044

7 Claims. (Cl. 118—53)

This invention relates to the application of ceramic coatings particularly to metal articles which it is desired to protect from direct contact with high-temperature gases. In the ordinary method of forming such coatings, an appropriate frit in a fine state of sub-division is mixed with a suitable liquid, usually water, to form a slip or thick suspension, the slip is applied to the surface to be coated, the liquid is driven off by vaporization, and the layer of finely divided, dried frit is then fused.

Except in situations where the slip is applied to a plane surface which can be disposed horizontally while the liquid is being driven off, difficulty is frequently encountered in producing a dried-frit coating of satisfactory uniform thickness. To overcome such difficulty, it has been proposed to rotate the slip-coated article about an axis during the drying period; but even with such rotation, water streaks and other inequalities occur with the result that the finished coating lacks the desired smoothness and uniformity.

It is an object of this invention to improve the uniformity and promote the surface smoothness of ceramic coatings. Another object of the invention is to produce a method and apparatus by the use of which frit-suspensions can be dried without formation of water streaks. Still another object of the invention is to produce an apparatus of simple and inexpensive construction which can be employed to distribute and dry applied frit-suspensions without the formation of water streaks or inequalities in thickness.

According to my invention, the frit-suspension, in fluid condition, as applied in any convenient manner to the article to be coated. Before the suspension has dried or set to any appreciable extent, the article to which it is applied is subjected to rotation about two different axes, and is maintained so rotating until the frit-suspension has set. During drying, the rotation is at a relatively low rate, so that gravity remains a significant factor in determining the direction in which the suspension or slip tends to flow over the article-surface.

Apparatus for carrying out the invention conveniently comprises a main frame, an outer sub-frame supported for rotation from the main frame, an inner sub-frame supported from rotation from the outer sub-frame, and means for securing the article being coated in fixed position in the inner sub-frame. Preferably, the axis of rotation of the outer sub-frame is horizontal while the axis of rotation of the inner sub-frame is perpendicular to and coplanar with the axis about which the outer sub-frame rotates. The inner sub-frame may carry a fan, a blower, or other device for forcing air over the coated surfaces and may also carry means for heating such air for speeding the drying operation. The heating means and the means employed to drive the fan, blower, or other device are desirably electrical in character and receive current through a system of brushes and collector rings.

Rotation of the coated article about the axis of either sub-frame may be employed with advantage in many instances to modify the distribution of the slip over coated surfaces before actual drying is begun.

Figure 3:
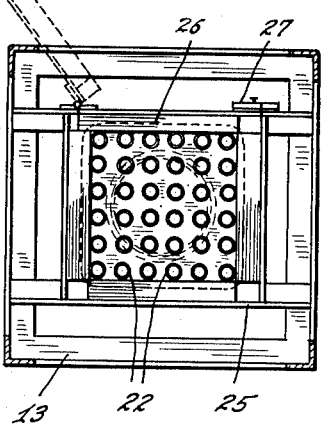
Figure 4:
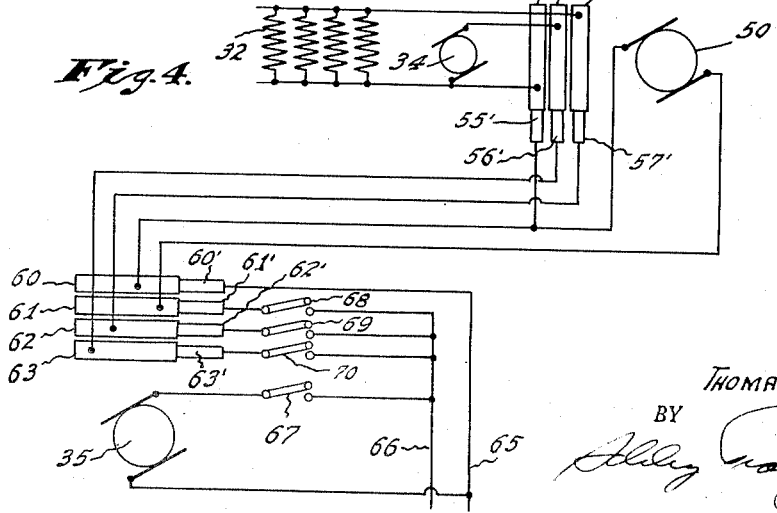

The accompanying drawings illustrate the invention: Fig. 1 is a side elevation of a preferred form of drying apparatus with a portion thereof broken away to illustrate interior construction; Fig. 2 is a plan view of the same apparatus, again with portions thereof broken away; Fig. 3 is a fragmental section on the line 3—3 of Fig. 2; Fig. 4 is a wiring diagram; and Fig. 5 is an elevation of a device which may be used in the initial application of the suspended frit.

The machine illustrated in Fig. 1 comprises a main frame 10 in which a horizontal, transverse shaft 11 is journaled. Rigidly mounted on the shaft 11 is an outer sub-frame 12 which rotatably supports an inner sub-frame 13. The inner sub-frame is conveniently of open construction and is adapted, as set forth more particularly hereinafter, to receive and support the article 14 which is to be coated. Conveniently, the inner sub-frame 13 is provided at its ends with aligned stub shafts 15 and 16 rotatably received in bearing blocks 17 mounted in the ends of the outer sub-frame 12. The common axis of the shafts 15 and 16 is perpendicular to and desirably coplanar with the axis of the shaft 11.

The particular object 14 illustrated in the drawings as being treated is the core of a heat exchanger such as is used to heat airplane wings by exhaust gases from the airplane engine. Such core comprises a pair of end heads 20 having aligned inlet and outlet nipples 21 and interconnected by a plurality of rows of tubes 22. The exhaust gases from the airplane engine enter one of the nipples 21, pass through the tubes 22, and are discharged from the other nipple 21. The ceramic coating, for the application of which the apparatus illustrated in the drawing is designed, is applied to the inner surfaces of the heads 20 and tubes 22 to protect them from the action of the high-temperature exhaust gases which flow through the core.

To support the core 14 in the inner sub-frame 13, the latter may be provided with an open-topped cradle 25 through the open top of which the heat-exchanger can be inserted or withdrawn. To hold the heat exchanger in place, I may employ a pair of retainers 26 hinged to the cradle 25 at one side of the top thereof, such retainers being provided with releasable latches 27 by means of which they may be held in closed position to retain the heat exchanger in the cradle. It will be understood, of course, that the particular type of cradle or other means for mounting the article to be treated in the inner sub-frame 13 will be varied as necessary to suit each particular article.

To aid in drying the frit-suspension which is applied to the inner surfaces of the heat exchanger, I may mount on the inner sub-frame 13 a casing 30 which extends transversely of the inner sub-frame across the adjacent end of the heat exchanger and which is provided in its side with an air outlet opening aligned with the adjacent nipple 21 of the heat exchanger. The casing 30 contains one or more electrical resistance heat elements 32 adapted to heat air which enters an inlet opening at one end of the casing and which is forced therethrough into the heat exchanger 14 by a fan 33. The fan 33 is conveniently driven by an electric motor 34.

For the purpose of rotating the shaft 11 and the outer sub-frame 12 rigid therewith, I may mount on the main frame 10 an electric motor 35 operatively connected to a speed-reducer 36 which is in turn connected through belts 37 with a pulley 38 on one end of the shaft 11. As it may be desirable in inserting or removing the article being coated to rotate the outer sub-frame 12 manually, the drive mechanism for the shaft 11 is desirably so arranged that it can be disconnected from the speed-reducer 36. To this end, the belts 37 may be loose enough to provide for independent rotation of the shaft 11 and may have associated with them a belt-tightening idler 40 conveniently mounted near the outer end of an arm 41 pivotally attached to the main frame 10. A spring 42 urges the idler 40 in the belt-tightening direction to tighten the belt 37 sufficiently to establish the driving connection to the pulley 38. To free the pulley 38 from connection with the speed reducer 36, the arm 41 may be swung against the spring 42 by a cable 43 extending to a convenient point at the front of the main frame 10, where it is connected to a lever 44 having appropriate releasable detent mechanism 45 operative to hold the idler 40 in retracted position.

For the purpose of rotating the inner sub-frame about the common axis of the shafts 15 and 16, the outer sub-frame 12 carries an electric motor 50 conveniently arranged on the sub-frame 12 with its axis transverse thereto. Appropriate drive means connects the motor 50 with a shaft 51, which extends longitudinally of the sub-frame 12 to one end thereof, where it is provided with a pulley 52 connected by belts 53 with a pulley 54 on the shaft 16.

To provide for the supply of electric current to the fan motor 34 and to the heating elements 32, the shaft 16 carries three collector rings 55, 56, and 57 with which there cooperate brushes 55', 56', and 57' supported from the outer sub-frame 12. The shaft 11 carries four collector rings 60, 61, 62, and 63 respectively engaged by brushes 60', 61', 62', and 63' mounted on the main frame 10. The electrical connections employed in the device illustrated are shown in Fig. 4. As there shown, one terminal of each heating element 32 and one terminal of the motor 34 are connected to the collector ring 55, the remaining terminals of the heating elements are connected to the collector ring 57, and the remaining terminal of the motor 34 is connected to the collector ring 56, such connections being effected by conductors carried by the inner sub-frame 13. One terminal of the motor 50 and the brush 55' are connected in common to the collector ring 60, the other terminal of the motor 50 is connected to the collector ring 61, and the brushes 56' and 57' are connected respectively to the collector rings 63 and 62, all such connections being effected by conductors carried by the outer sub-frame 12. The conductor 65 of a supply line 65—66 is connected in common to the brush 60' and to one terminal of the motor 35, while the other terminal of such motor is connected to the conductor 66 through a control switch 67. The brushes 61', 62', and 63' are connected, through switches 68, 69, and 70, with the conductor 66. As will be obvious, the switches 68, 69, and 70 permit independent control of the heating elements, the fan motor 34, the motor 50 which rotates the inner sub-frame 13 in the outer sub-frame 12, and the motor 35 which rotates the outer sub-frame 12 and the main frame 10.

In Fig. 5, I have illustrated an apparatus which may be employed in the initial application of the frit suspension. Such apparatus comprises a frame 75 from which a vertical plate 76 is supported for rotation about a horizontal axis. Such plate carries means such as a set of projecting posts 77 adapted to receive and support the core 14 by engagement with the heads 20 thereof. In the lower portion of the frame 75, there is mounted a tank 78 containing a supply of frit suspension and connected through a conduit 79 with a pump 80 which discharges through a flexible conduit 81. The pump 80 is conveniently under the control of a foot-operated switch 82.

To use the apparatus shown in Fig. 5, the plate 76 is disposed as indicated and a core 14 is positioned vertically on the posts 77. With the conduit 81 positioned to discharge into the upper head 20, and with the lower nipple 21 temporarily closed by a closure 83, the switch 82 is closed to cause frit-suspension in the tank 78 to be pumped into the core 14. The closure 83 conveniently comprises a plate faced with sponge rubber or other suitable compressible material. After a sufficient quantity of the frit-suspension has been pumped into the core 14, the pump 80 is stopped, the flexible conduit 81 is removed, a second closure 83 is applied to the open upper end of the core, and with both closures held in place, the core and plate are rotated into and oscillated about the dotted-line position shown in Fig. 5 to bring the frit-suspension into contact with all portions of the inner surfaces of the core. When all inner surface portions of the core have been coated, the core and the plate 76 are restored to the full-line position shown in Fig. 5 and the closures removed to permit the excess frit-suspension to drain from the core. Conveniently, the frit-suspension discharged from the core passes through screens 85 into an inclined trough 86 through which it is returned to the tank 78.

With the inner surfaces of the core coated as above described, the core is transferred to the machine shown in Figs. 1, 2, and 3, being placed in the cradle 25 and secured therein by the retainers 26. In this position, one of the open ends of the core is in alignment and communication with the outlet opening of the casing 30. To facilitate bringing the sub-frames into position for the cradle to receive the core, the lever 44 is operated to retract the idler 40 and slacken the belt 37, the lever being released to again tighten the belt when the sub-frames have been brought manually into the desired position. With the core locked in the cradle 25, the switches 67 and 68 are closed to institute operation of the motors 35 and 50, such motors serving, respectively, to rotate the outer sub-frame 12 about the horizontal axis of the shaft 11 and to rotate the inner sub-frame 13 about the common axis of the shafts 15 and 16. Both rotations, as previously indicated, are at a relatvely low rate— say about 35 revolutions per minute in the case of an article whose maximum distance from either axis is about twelve inches—so that gravity remains a significant factor influencing the tendency of the still liquid slip to flow over the surfaces to which it has been applied. Because of the rotations of the core 14, the inclination of any point on the coated surface of the core is continually changing in two senses. If, as is desirable, the two rotations of the core 14 are at slightly different rates, a considerable time interval will elapse, and considerable drying will occur, between passages of the core 14 through the same condition of orientation with respect to both of the axes about which it rotates. During the rotation of the core, the force of gravity acts to cause a continuous displacement of the frit-suspension as long as that suspension remains liquid; and in consequence of the double rotation of the core, the direction and rate of displacement at any point in the suspension is continually changing. Because of the complex motion of the suspension, it dries into a uniform, smooth coating ready for the firing operation.

During the rotation of the core, the fan 33 and the heating elements 32 may be operated as desired to expedite drying.

Although desirable, and also convenient in the apparatus illustrated, it is not essential that either rotation of the core 14 be a continuous rotation.

Rotation of the coated article about the axis of either of the sub-frames may be utilized, prior to or during drying, to modify the distribution of the slip over the surfaces to which it has initially been applied. For example, in the heat-exchanger core illustrated in the drawing, surface tension tends to create a thickened coating at the interior corners of the heads 20 where the square header-plate which receives the tubes 22 joins the peripheral head-wall. Rotation of the core about the axis of the shaft 11 creates a centrifugal force which tends to draw the locally accumulated material out of such corners. On the other hand, rotation of the core about the axis of the shafts 15 and 16 tends to force material toward such corners. Localized variations in coating-material thickness are desirably avoided; for they are subject to thermal shock which may cause cracking. Accordingly, it is of advantage in treating an article of the type illustrated to rotate it first about the axis of the shaft 11, while the article and inner sub-frame 13 remain in fixed position relative to the rotating outer sub-frame 12. In such rotation, excess coating material is thrown out of the open ends of the core and accumulations in the corners of the heads are largely eliminated. After such excess material is removed, the motor 50 may be started to cause rotation of the core and inner sub-frame 13 in the outer sub-frame 12 without causing an undue accumulation of the slip in the corners of the heads.

It will be understood, of course, that the precise sequence in which the two different rotations are begun will depend upon the character of the article being coated and upon the possibility of eliminating or reducing localized accumulations of the coating material under the influence of centrifugal force. It many cases, the two rotations may be instituted simultaneously. When rotation of the article about either or both of the possible axes is employed to modify the distribution of coating material, it will usually be advisable to delay operation of the fan and heating elements until such modified distribution has been obtained. After the drying operation has begun, such flow of the still liquid slip as occurs at any point will be determined in velocity and direction by the resultant of centrifugal force and gravity. Generally, the effect of centrifugal force on the direction and velocity of local flow will not vary significantly as long as the rotation about each axis remains at a constant rate, but the effect of gravity on both direction and velocity of flow will be continually changing. At the speeds of rotation mentioned above, the maximum centrifugal force will be roughly one-half the force of gravity; and, as a result, the resultant flow-inducing force can vary widely in direction to cause a complex flow-pattern which is conducive to the production of uniform coating-thickness and the elimination of water streaks.

Rotation of the coated article about a vertical axis would not change the aspect of any surface portion relative to the downward direction, and hence would not modify the effect of gravity in influencing the direction of local slip-flow. In consequence, the axis about which the outer sub-frame rotates during the drying operation should depart considerably from the vertical. Most desirably, such axis is horizontal, as in the machine shown.

I claim as my invention:

1. In apparatus of the type described, a main frame, inner and outer sub-frames, means supporting the outer sub-frame from the main frame for rotation about a first axis, means supporting the inner sub-frame from the outer sub-frame for rotation about a second axis coplanar with and perpendicular to said first axis, means for securing an article to be treated in the inner sub-frame, air-heating means mounted on the inner sub-frame, air-moving means mounted on the inner sub-frame for forcing air over the air-heating means to the article, a first motor carried by the outer sub-frame for rotating the inner sub-frame about said second axis, a second motor on the main frame for rotating the outer sub-frame about said first axis, and means for independently controlling said air-heating means, said air-moving means, said first motor and said second motor.

2. In apparatus of the type described, a main frame, inner and outer sub-frames, means supporting the outer sub-frame from the main frame for rotation about a first axis, means supporting the inner sub-frame from the outer sub-frame for rotation about a second axis substantially at a right angle to said first axis, means for securing an article to be treated in the inner sub-frame, air-heating means mounted on the inner sub-frame, air-moving means mounted on the inner sub-frame for forcing air over the air-heating means to the article, a first motor carried by the outer sub-frame for rotating the inner sub-frame about said second axis, a second motor on the main frame for rotating the outer sub-frame about said first axis, and means for independently controlling said air-heating means, said air-moving means, said first motor and said second motor.

3. In apparatus of the type described, a main frame, inner and outer sub-frames, means supporting the outer sub-frame from the main frame for rotation about a first axis, means supporting the inner sub-frame from the outer sub-frame for rotation about a second axis substantially at a right angle to said first axis, means for securing an article to be treated in the inner sub-frame, air-heating means mounted on the inner sub-frame, air-moving means mounted on the inner sub-frame for forcing air over the air-heating means to the article, means for rotating the outer sub-frame about said first axis, and means for rotating the inner sub-frame about said second axis.

4. The invention set forth in claim 3 with the addition that said two sub-frame rotating means are independently controllable.

5. In apparatus of the type described, a main frame, inner and outer sub-frames, means supporting the outer sub-frame from the main frame for rotation about a first axis, means supporting the inner sub-frame from the outer sub-frame for rotation about a second axis substantially at a right angle to said first axis, means for securing an article to be treated in the inner sub-frame, a first drive means for rotating the outer sub-frame about said first axis, and a second drive means for rotating the inner sub-frame about the second axis, both said drive means being operable simultaneously and at least one of them being operable independently of the other.

6. The invention set forth in claim 3 with the addition that said first axis is horizontal.

7. The invention set forth in claim 5 with the addition that said first axis is horizontal.

THOMAS SHERMAN McCLEAN.

References Cited in the file of this patent

UNITED STATES PATENTS

| Number | Name | Date |
| --- | --- | --- |
| 1,649,153 | Comp | Nov. 15, 1927 |
| 1,787,524 | Heinzman | Jan. 6, 1931 |
| 1,796,819 | Adams | Mar. 17, 1931 |
| 1,851,509 | Hampton | Mar. 29, 1932 |
| 1,932,713 | Snyder et al. | Oct. 31, 1933 |
| 2,102,819 | Ronci | Dec. 21, 1937 |
| 2,341,198 | Weiskopf | Feb. 8, 1944 |
| 2,381,974 | Emerson | Aug. 14, 1945 |
| 2,386,591 | Campbell | Oct. 9, 1945 |
| 2,387,349 | Powers | Oct. 23, 1945 |
| 2,580,131 | Rowell | Dec. 25, 1951 |